April 1, 1969     B. N. SVENSON     3,436,072
SELF-ADJUSTING WORKPIECE CLAMP
Filed Sept. 14, 1965
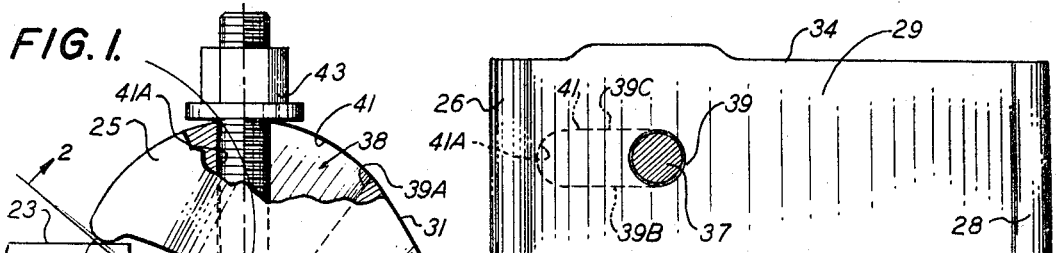
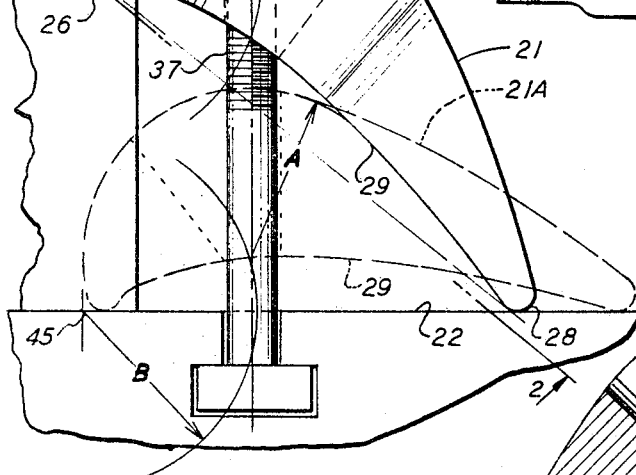
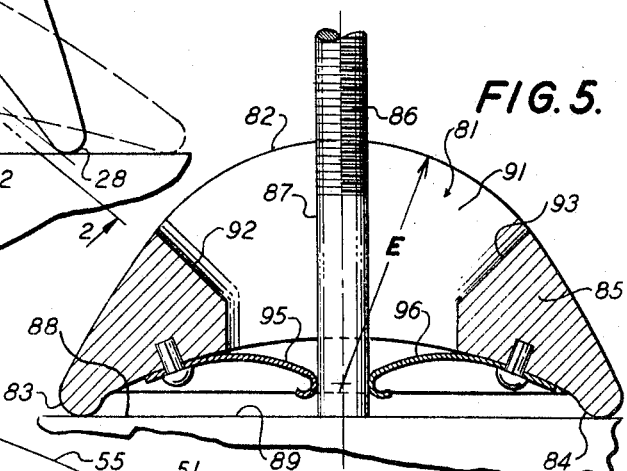
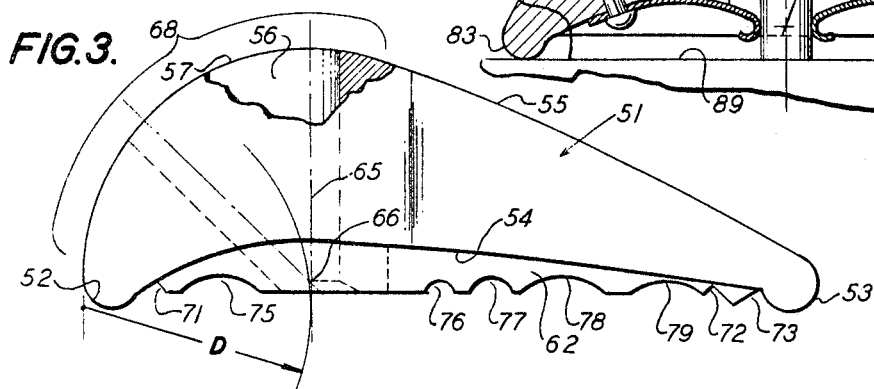
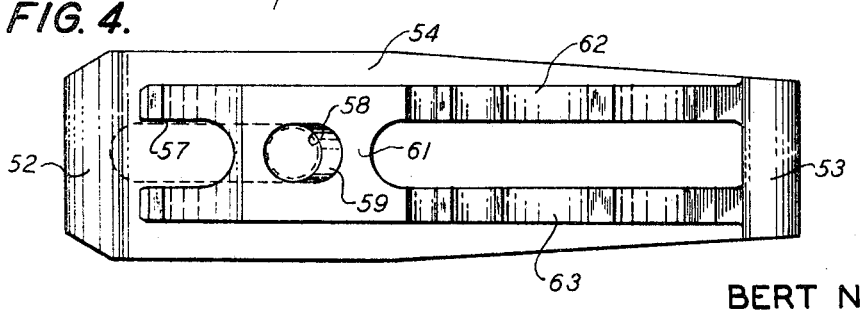
INVENTOR.
BERT N. SVENSON
BY
W. J. Gribble
ATTORNEY

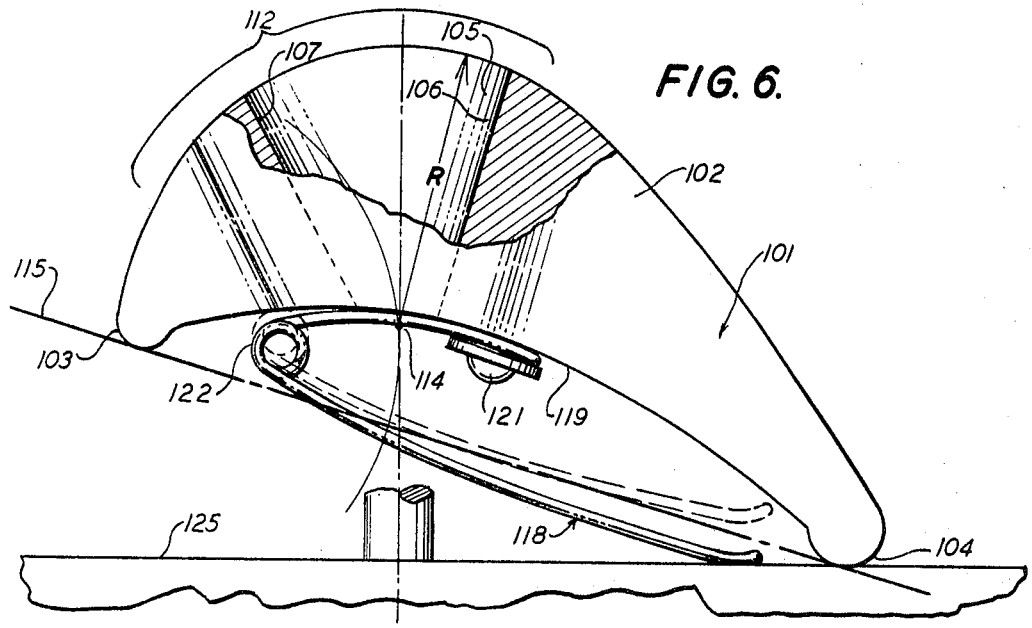
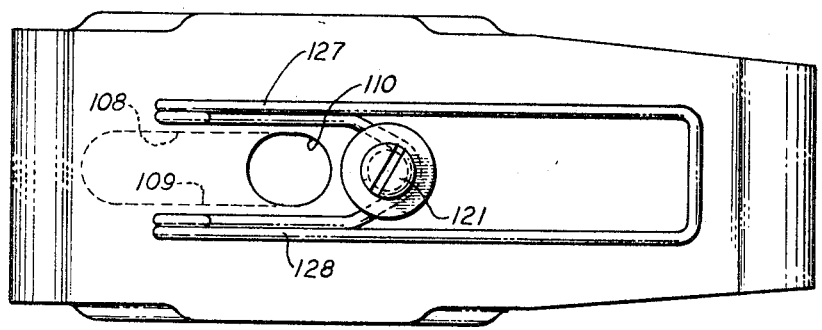

April 1, 1969  B. N. SVENSON  3,436,072
SELF-ADJUSTING WORKPIECE CLAMP
Filed Sept. 14, 1965  Sheet 3 of 3
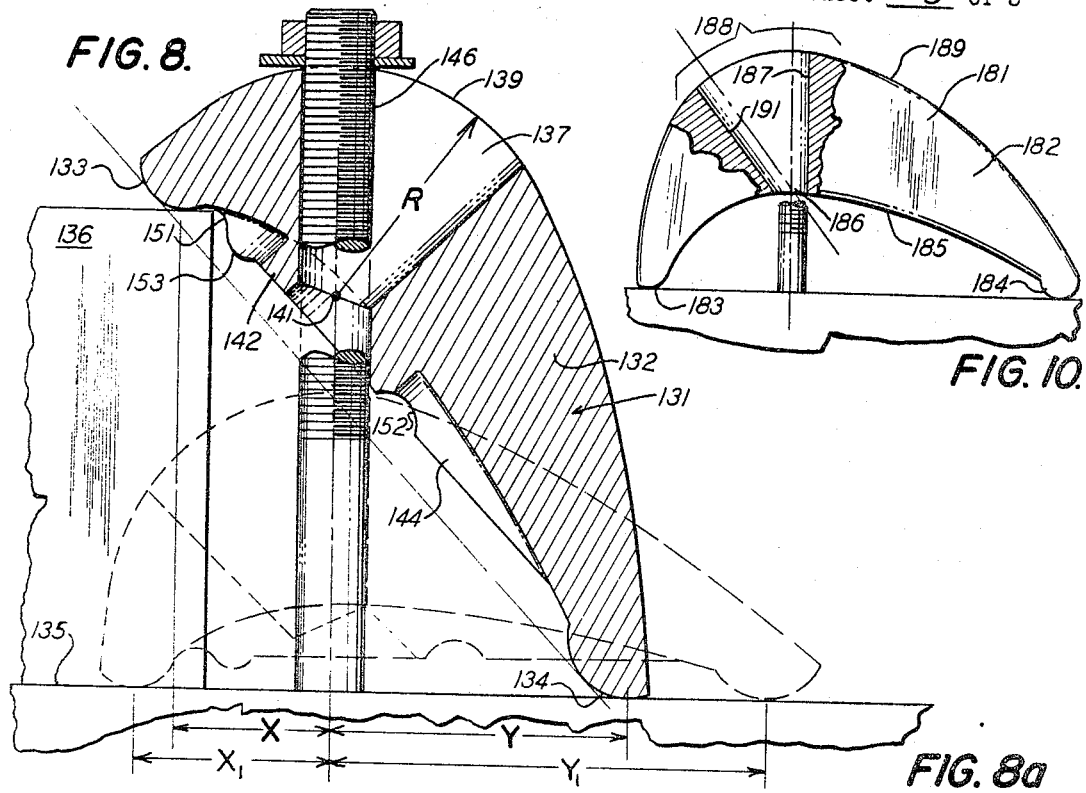
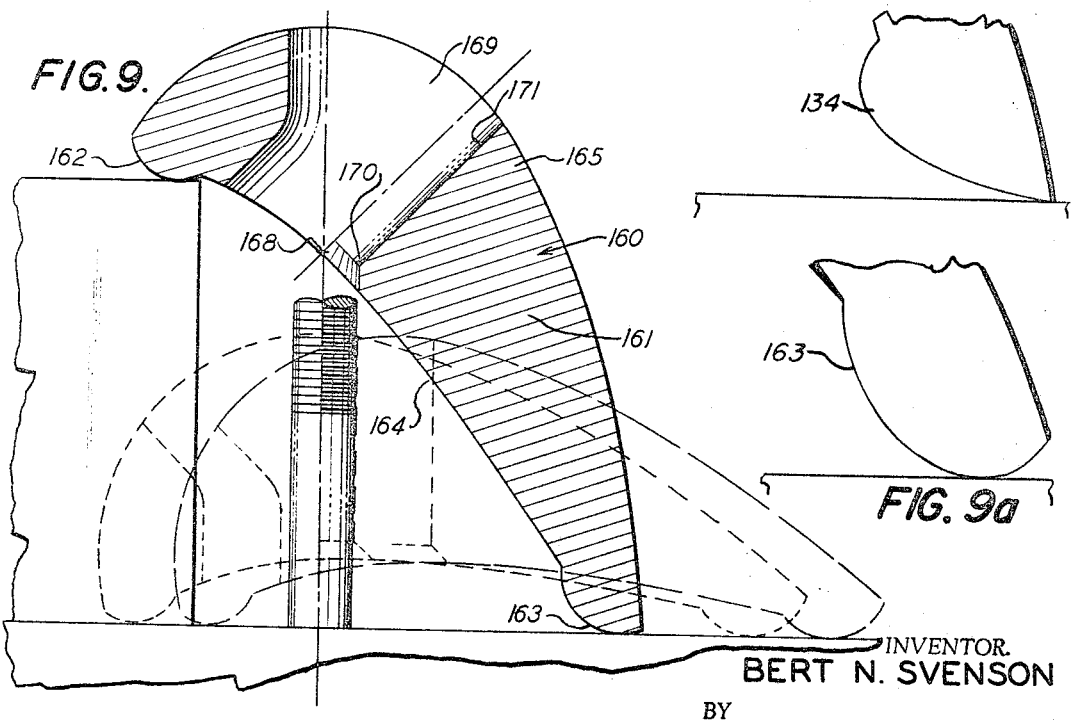
INVENTOR.
BERT N. SVENSON
BY
W. J. Gribble
ATTORNEY 3,436,072
SELF-ADJUSTING WORKPIECE CLAMP
Bert N. Svenson, 10747 Spry St., Norwalk, Calif. 90650
Filed Sept. 14, 1965, Ser. No. 487,199
Int. Cl. B23q 3/02
U.S. Cl. 269—94     5 Claims

ABSTRACT OF THE DISCLOSURE

An arcuate workpiece clamp for use with a post secured to the work rest. The clamp has a central aperture opening upwardly to an arcuate horizontal surface of the clamp, and opening downwardly in a restricted throat approximately the diameter or cross-section of the fixed bolt. The opening in the clamp body may be restricted by the walls of the aperture or by resilient restrictors adapted to bear against the bolt. The restriction acts to continuously adjust the clamp with respect to the post such that the ratio of clamp load upon the workpiece to the load upon the work rest is as nearly constant as possible. Each extreme of the clamp body has a bearing end adapted to contact either the workpiece or the work rest. The contacting surface of each bearing end may be contoured or curved to shift the point of contact with respect to the workpiece or the work rest such that the previously mentioned load ratio remains constant. The radius of the arcuate upper clamp body surface is defined by a radius drawn from a center that is above the tangent plane common to the bearing ends of the workpiece.

---

Conventional clamping tools for clamping workpieces have heretofore been made from steel or iron to provide adequate clamp strength. The disadvantage with these materials is that soft shim stock or other padding material must be used between the clamp and the workpiece to prevent markings on workpieces. The use of shim stock entails more time and labor and adjustment between the clamp and the workpiece. Other disadvantages of conventional clamps have been that the height of the workpiece that the clamp could accept has been limited to half or less of the height of the clamp. Conventionally, one end of the clamp must be blocked up or elevated from the work rest to provide sufficient clamping force on the workpiece. I have invented a clamp that has such structural strength that materials that do not normally mar the workpiece, such as aluminum or brass, can be used for the clamp. By using softer materials, damage to tool bits which may contact the clamps is lessened. Additionally, the clamp of the invention is self-adjusting with respect to the work rest post such that the ratio of clamp load upon the workpiece to the load upon the work rest is nearly constant regardless of the thickness of workpiece being clamped.

The invention contemplates a workpiece clamp for use with an elongate work rest post and post binding means, such as a nut and washer, for securing a workpiece to a work rest. The clamp comprises a clamp body having inner body walls which define a body slot adapted to encircle the work rest post. The body walls diminish from the top of the clamp body to an aperture at the bottom of the clamp body that approximates the diameter of the post. Alternatively, the body aperture may be larger than the diameter of the post and have resilient means for restricting the aperture. Each extreme of the elongate clamp body has a bearing end adapted to contact either the workpiece or the work rest.

The upper body surface is arcuate along a longitudinal portion of its extent generally commensurate with the opening of the slot defined by the inner body walls. Preferably, the radius of the arcuate upper body surface is defined by a radius drawn from a center that is above the tangent plane common to the bearing ends of the workpiece. The distance above the plane preferably does not exceed 150% of the diameter of the work rest post. The lower body surface preferably is curvilinear for at least a portion of its extent between the body bearing ends. The degree of curvature of the lower body surface is prefably less than the curvature of the upper arcuate portion. The material between the upper and lower surfaces of the clamp body determines its strength and thus the post with which the clamp can be used.

In a preferred embodiment of the invention, the center point for the radius describing the arcuate upper body surface portion coincides with the intersection of a radius drawn from the nose or workpiece clamping surface of the clamp body that is substantially tangent to the center line of the work rest post in the working positions of the clamp and the line of greatest restriction of the body slot.

Each of the bearing ends of the clamp body preferably is a surface contoured to combine with the self-centering aspect of the clamp to maintain a constant ratio between the respective resultant clamping pressures upon the workpiece and the work rest. These pressures are a factor of the distance projected to the work rest table of the spaces between the workpiece bearing end point of contact and the work rest bearing end point of contact and the center line of the work rest post. The bearing end contours provide for displacement of the contact line of the bearing ends as the attitude of the clamp body is shifted with the change in thickness of the workpiece upon the work rest.

These and other advantages of the invention are apparent from the following detailed description and drawing in which:

FIG. 1 is a sectional elevation of a workpiece clamp in accordance with the invention shown upon a schematically represented work rest and workpiece;

FIG. 2 is a bottom plan view taken along line 2—2 of FIG. 1;

FIG. 3 is a side elevation, partly in section, of an alternate embodiment of the invention;

FIG. 4 is a bottom plan view of the workpiece clamp of FIG. 3;

FIG. 5 is a sectional elevation of an alternate embodiment of the invention, having resilient means for maintaining the clamp in relation to the work rest post;

FIG. 6 is a side elevational view of a further alternate embodiment of the invention;

FIG. 7 is a bottom plan view of the embodiment of FIG. 6;

FIG. 8 is a sectional elevation of a further alternate embodiment of the invention in place upon a work rest and clamping a workpiece;

FIG. 8a is a fragmentary view showing schematically the bearing end configuration;

FIG. 9 is a sectional elevation of a still further alternate embodiment of the invention in use;

FIG. 9a is a fragmentary view showing schematically the bearing end configuration.

FIG. 10 is a side elevation of a clamp in accordance with the invention adapted for use with smaller workpieces;

A self-adjusting workpiece clamp 21 is shown in FIGS. 1 and 2. In FIG. 1 clamp 21 rests upon a work rest 22 and a workpiece 23. A dotted line showing of the clamp at 21A shows the clamp at rest.

The clamp comprises a clamp body 25 having a rounded nose 26 which bears upon the workpiece and a rounded tail 28 which bears upon the work rest. The body is preferably of aluminum or brass. A bottom surface 29 which is slightly concave connects between the nose and the tail. A curvilinear upper surface 31 extends between the nose 26 and the tail 28 to define the upper limits of the clamp body. As can be seen in FIG. 2, the body is thicker about the forward clamp portion, but body sides 34, 35 are substantially parallel and vertical. The clamp body may taper to a lesser thickness at its tail, if desired.

In FIG. 1 a work rest binding post 37 is held in vertical orientation in the work rest by conventional means, such as square post head in a T slot. The work rest extends through a body slot 38 in clamp body 25. The body slot extends from a substantially circular bottom opening 39 upwardly through the body and emerges through upper surface 31 in an oval aperture 41, shown in dotted lines in FIG. 2.

The spaced end walls 39A and 41A of the body slot are semi-cylindrical and joined by substantially planar walls 39B, 39C. Aperture 39 has approximately the same diameter as the binding post 37. Therefore, as the clamp is canted along the shank of the post between the dotted position shown by clamp 21A upwardly to the position of clamp 21, the center line or axis of the post and the center line of aperture 39 more or less coincide. Thus the space relationship between the binding post axis and nose 26 and tail 28 tends to be maintained. Therefore, the binding force imposed upon the clamp body by a nut and washer assembly 43 engaged with the threaded shank of post 37 tends to be distributed between the workpiece and the work rest in the same proportion regardless of the height or height of the work clamp nose imposed by the thickness or height of a workpiece, such as workpiece 23 of FIG. 1.

In order for the nut and washer assembly to thrust effectively upon the workpiece clamp through all of the various positions imposed by varying workpiece thicknesses, a portion of the upper surface of the clamp 31 is arcuate. In the embodiment shown in FIG. 1, the center for radius A of the arcuate portion is determined by the radius B which is circumscribed from a point 45 coinciding with the top surface of the work rest and the nose end of the dotted clamp body 21A. Radius B defines an arc to which the post axis is substantially tangent as the clamp body assumes its various positions to clamp various workpieces. The arc defined by radius B coincides with the line of the post axis at the center of aperture 39. Radius A is based at this point of coincidence. Preferably radius A is approximately equal to radius B. The clamp then has sufficient depth for strength when made from relatively soft material, such as cast 355T6 and 356T6 aluminum or from brass of similar qualities.

The clamp of FIGS. 1 and 2 is capable of efficiently clamping workpieces having a thickness above the work rest of substantially more than half the distance between nose 26 and tail 28. The particular configuration of the clamp body is such that the bearing load upon the workpiece and the work rest is in substantially the same ratio regardless of the height to which the nose of the clamp is raised. The clamp body may be made from the above specified materials and have a strength because of its configuration that exceeds that of the bolt with which it is designed to cooperate. Thus the bolt will break before the clamp if excessive force is applied during the clamping process. Since the bolt is more readily replaced than the clamp, this is a desirable situation.

In FIGS. 3 and 4 a clamp 51 has semicylindrical nose and tail ends 52, 53, respectively, between which a concave bottom surface 54 extends. An upper surface 55 of the clamp has a greater degree of curvature than the bottom surface in its extent between ends 52 and 53. A body slot 56 terminates at the upper surfaces in an aperture 57 shown in dotted lines in FIG. 4. The end inner walls defining the body slot are semicylindrical and converge downwardly to a restricted throat 58, best seen in FIG. 4.

The restricted throat approximates the diameter of the work rest post with which the clamp is used. A semiconical relief opening 59 extends toward the tail end of the clamp. The restricted throat 58 and the relief opening 59 both reside in a boss 61 which lies between parallel spaced ribs 62, 63 that protrude from bottom surface 54 for most of its extent. The work rest post axis 65 emerges from the bottom of the clamp body coincident with the center of the restricted throat 58. At the point 66 where the restricted throat and the post axis cross in elevation is the radius center point for an arcuate portion 68 of the upper clamp body surface. When the clamp is in rest position wherein both ends 52 and 53 reside on the work rest, the axis of the post is tangent to an arc with a radius D drawn from a center point adjacent nose 52 and based on the plane of the work rest. Thus, center point 66 of the radius which describes the arcuate portion 68 is above the plane tangentially contacting both of the bearing ends of the clamp body.

Ribs 62, 63 have as their prime function provision of means for clamping to the work rest shaped pieces, such as round rods and angles. A plurality of apertures 71, 72, 73 are defined by the ribs. These apertures are particularly adapted to clamping angles. Rib apertures 75, 76, 77, 78, 79 are substantially arcuate and adapted securely to bind rounded objects to the work rest. While the ribs 62, 63 have been shown as narrow strips, they may be as thick as the width of the clamp body if added material is needed for strength.

As with the previously described embodiment, the embodiment of FIGS. 3 and 4 is adapted to use with workpieces of thicknesses over 50% or more of the span between the bearing ends 52, 53. Throughout this span of utility the restricted throat constrains the clamp attitude with respect of the binding posts such that the nut and washer (not shown), which are in tangential contact with arcuate surface 68, impose upon the bearing ends clamping forces that are in the same proportion.

FIG. 5 illustrates in sectional elevation a self-centering symmetrical clamp 81 adapted for securing two workpieces at once. The clamp has a substantially arcuate upper surface 82 extending between substantially semicylindrical nose and tail ends 83, 84 of the clamp body 85. The center point for a radius E which defines the arcuate upper surface 82 is coincident with an axis 86 of a work rest post 87 shown fragmentarily. The clamp seats upon a work rest 88 whose upper surface 89 is substantially planar.

A body slot 91 extends vertically through the clamp body. The upper aperture of the body is wider than the lower aperture because semicyclindrical walls 92, 93 diverge upwardly and in part define the slot. The lower aperture of the clamp body is wider than the diameter of post 87. However, the effective aperture is defined by a pair of restrictive leaf springs 95, 96, which comprise a restrictive throat slightly above the plane 89 of the work rest. Thus the point of radius E is above a plane common to the bearing ends 83, 84 of the clamp body. The resilient springs 95, 96 hold the relationship between the binding post and the bearing ends 83, 84. Thus the operator is assured of some uniformity in the clamping pressure which the clamp will accept since the relationship between the bearing ends and the binding post is maintained such that the proportion of pressure on the work piece is the same regardless of the attitude of the clamp body.

The springs provide for the clamp to be moved horizontally to slide off the workpiece for removal thereof without the necessity of manually realigning the clamp body with respect to the binding post. The resiliency of the springs will return the clamp to the desired center position. The symmetry of the clamp also allows it to be turned about thte post 90° to release the workpiece or workpieces.

A self-adjusting or self-centering clamp 101 is illustrated in FIGS. 6 and 7. A clamp body 102 has a nose bearing end 103 and a work rest bearing end 104. A body slot 105 is defined by cylindrical walls 106, 107 and planar side walls 108, 109, shown in dotted lines in FIG. 7. The body slot narrows to a restricted throat 110 that approximates the diameter of the binding post (not shown) with which the clamp is used. The closeness of the fit of the restricted throat to the post diameter maintains the relative distance between the axis of the post and the bearing ends 103, 104, such that the proportionate binding force upon the workpiece is maintained in all useful clamp attitudes.

The arcuate upper surface 112 of the clamp body is defined by a radius R whose center-point is at 114. The point 114 is above the plane (shown as a line 115 in FIG. 6) common to the two bearing ends.

A doubled wire spring 118 is fixed to a bottom surface 119 of the clamp body by means of a screw 121 secured in the body. The spring has a helical winding 122 to give it considerable resilience. When the clamp is canted upwardly with respect to work rest surface 125, as shown in FIG. 6, the spaced legs 127, 128 of the spring span the post while pressing against the work rest. When the nut and washer assembly (not shown) conventionally used for binding the clamp in holding position against the workpiece are removed, the spring raises the clamp away from the workpiece to facilitate its removal. While a wire spring has been shown, a leaf spring of flat spring steel or similar material, may be used if provision is made for passage of the spring about the binding post.

A preferred clamp in accordance with the invention is shown in FIG. 8. In that figure a clamp 131 having a clamp body 132 with a bearing end nose 133 and bearing end tail 134 is shown canted above a work rest 135. A workpiece 136 is shown fragmentarily.

A body slot 137 for the work rest post extends through the clamp vertically. The body slot has an elongate aperture where it emerges through the arcuate upper surface 139 of the clamp. The upper aperture has the general configuration of an oval, while a lower aperture 141 emerging through a boss 142 between elongate ribs, like rib 144, is a lesser oval. Between the two emerging apertures a restrictive throat is defined. The throat is substantially circular in configuration and approximates in diameter the diameter of the binding post 146, shown fragmentarily. As in the previously described embodiments, the restricted throat tends to hold the clamp body in a certain relationship to the work rest binding post. The center of the restrictive throat contains the center point for the arc which describes the arcuate upper surface 139 of the clamp body. This point is above a plane common to the two bearing ends 133, 134.

In the embodiment shown, the self-centering ability remains unchanged regardless of the clamping height (determined by the thickness of the workpiece 136). However, in the embodiment shown the bearing ends 133, 134 have a developed curving surface, such that the ratio of the distance X from the post center to the clamping end and the distance Y from the post center to the table end lines of contact remains substantially constant. The ratio here shown is approximately one to two. Given a clamping force of 21,000 pounds, approximately 6,300 pounds will be imposed upon the work rest and 14,700 pounds approximately will be imposed upon the workpiece. This ratio remains constant through the full clamping range, thereby providing the operator with a "feel" for the clamping force simply by using the same torque value on the clamping nut at all clamping heights.

Two ribs like rib 144 project from the bottom surface of the clamp body. The ribs have shaped apertures 151, 152 and a shaped protrusion 153 to afford secure clamping for particularly shaped workpieces.

A further alternate embodiment of the invention is shown in FIG. 9 in sectional elevation. A clamp 160 has a clamp body 161 with shaped bearing ends 162, 163, a curving bottom surface 164 and a curving upper surface 165, which contains an arcuate portion whose curvature is determined by a radius based at point 168. A body slot 169 extends through the clamp body. The body slot is not restricted in its bottom aperture. However, a slot shoulder 170 is formed by a change in the direction of the semicyclindrical wall 171 which defines one portion of the body slot. By registering the slot shoulder against the post an operator can maintain the clamp in the same position relative to the distances between the post and the bearing ends. By not having the restrictive throat the clamp may be moved rightwardly in the figure away from the workpiece without complete removal of the binding nut on the post. The clamp of FIG. 9 is thus capable of maintaining the substantially constant ratio between the clamping pressures imposed upon the workpiece and the work rest if properly manipulated by the operator.

It is to be noted that the varying curvature of the nose and tail bearing ends of the clamps 131 of FIG. 8 and 160 of FIG. 9 differ. The surfaces defining the bearing ends 133 and 134 of clamp 131 increase in degree of curvature as the curve progresses inboard (see FIG. 8a). In the clamp 160 of FIG. 9 the nose and tail bearing ends 162, 163 increase in degree of curvature as the curve progresses outboard (see FIG. 9a). Thus the clamp of FIG. 8 is adapted to move the line of contact with both work rest and workpiece such that the ratio between the respective clamping loads on the work rest and workpiece remain substantantially constant. The clamp of FIG. 9, on the other hand, tends to move the line of contact of the bearing ends such that the clamping force on the workpiece decreases proportionately as the displacement of the bearing end nose increases from the work rest. Thus the clamp of FIG. 9 is one in which the clamp tends to maintain the same relationship with respect to the binding post but is combined with bearing ends of a particular configuration such that the contact line changes with clamp attitude to vary the ratio between the clamping pressures at the workpiece and the work rest.

The embodiment of FIG. 10 is a clamp 181 having a clamp body 182 and bearing ends that are substantially semicylindrical. Nose end 183 and tail end 184 are connected by a concave bottom surface 185 which is concave in its extent between the bearing ends. The degree of curvature of the bottom surface increases rapidly as it approaches the nose 183. The nose is therefore spaced downwardly toward the work rest with respect to a restrictive throat 186 of a body slot 187. The body slot diverges in the longitudinal axis of the clamp body and emerges through an arcuate portion 188 of a curving top body surface 189. The arcuate portion is described by a radius which has its center within the body of the clamp but substantially on the axis line of the binding post with which the clamp is used when the clamp is in the position of clamping a workpiece of zero thickness. The height which the clamp can accommodate is determined by end wall 191 of the body slot. As the clamp is rocked rightwardly on the curving tail end 184, wall 191 approaches the binding post (not shown). In order to have sufficient strength, the clamp must have depth at the body slot. This depth can be achieved if the radius of arcuate portion 188 is rather small. Therefore, the degree of canting possible to the clamp is limited by the relatively small arcuate surface to which the nut and washer binding assembly can remain tangent.

While different embodiments of the self-adjusting workpiece clamp of the invention have been used to illustrate the invention in the foregoing disclosure, many other variations within the scope of the invention will occur to those skilled in this particular art. Therefore, I do not wish to be limited to the illustrative forms disclosed herein, but rather prefer that the scope of the invention be defined by the appended claims.

I claim:

1. A workpiece clamp for use with a work rest and a work rest binding post with binding means and comprising a clamp body, a pair of longitudinally spaced bearing ends on the body, a body slot adapted to receive the post, said slot having a width substantially equal to the width of the post and a length diminishing to a restricted throat at that surface of the clamp body adapted to be adjacent the work rest, said restricted throat having longitudinal and transverse dimensions approximating the cross-sectional area of the post; a curvilinear upper clamp body surface having an arcuate surface portion defined by a radius whose center lies between a plane tangent to both bearing ends and the upper surface of the clamp body and lies substantially in line transversely of the body with the axis of the binding post in position within the clamp body slot; said binding means adapted to grip the post and bear tangentially against the arcuate portion of the upper body surface.

2. Apparatus in accordance with claim 1 wherein the radius center lies on a central arc described about a center lying at the intersection of the plane tangent to the bearing ends and an extension of the arcuate surface to the plane, said arc being in tangential relationship to the axis of the post when in the body slot.

3. Apparatus in accordance with claim 1 wherein the center of the arcuate surface portion radius coincides with the plane of the restricted throat of the body slot.

4. Apparatus in accordance with claim 1 wherein the bearing ends have curvilinear surfaces generated by a transverse straight line progressing longitudinally inboard of the clamp body in an increasing curvilinear manner.

5. Apparatus in accordance with claim 1 wherein the bearing ends have curvilinear surfaces defined each by a transverse line progressing curvilinearly inboard longitudinally of the clamp body, the bearing end surfaces so defined being adapted to contact the work rest and the workpiece at contact areas on the bearing end surfaces displaced with respect to the axis of the binding post such that the ratio of the clamping force on the workpiece respective to the force imposed on the work rest is undiminished as the workpiece thickness increases, assuming a constant tension force in the post.

References Cited

UNITED STATES PATENTS 1,995,206   3/1935   Geissbühler _____ 269—94

FOREIGN PATENTS 107,926   7/1917   Great Britain.
747,778   4/1956   Great Britain.

LESTER M. SWINGLE, *Primary Examiner.*

JAMES F. McKEOWN, *Assistant Examiner.*